(12) United States Patent
Vigano'

(10) Patent No.: US 6,312,044 B1
(45) Date of Patent: Nov. 6, 2001

(54) PIVOTING ACCESS INTO TRANSPORTATION VEHICLES

(76) Inventor: Giorgio Vigano', Via S. Biffi, 1, I-20050 Triuggio (IT)

( * ) Notice: Subject to any disclaimer, the term of this patent is extended or adjusted under 35 U.S.C. 154(b) by 0 days.

(21) Appl. No.: 09/581,622

(22) PCT Filed: Dec. 11, 1998

(86) PCT No.: PCT/IT98/00359

§ 371 Date: Jun. 15, 2000

§ 102(e) Date: Jun. 15, 2000

(87) PCT Pub. No.: WO99/30957

PCT Pub. Date: Jun. 24, 1999

(30) Foreign Application Priority Data

Dec. 15, 1997  (IT) .............................................. RM97A0778

(51) Int. Cl.⁷ .................. B60J 5/02; B60J 7/08
(52) U.S. Cl. .................. 296/185; 296/147; 296/146.11; 296/100.06
(58) Field of Search .................. 296/185, 35.3, 296/35.4, 107.2, 100.06, 146.11, 147, 210, 216.02

(56) References Cited

U.S. PATENT DOCUMENTS

| | | | | |
|---|---|---|---|---|
| 2,533,752 | * | 12/1950 | Alamagny | 180/21 |
| 2,569,218 | * | 9/1951 | Bailey, Jr. | 180/69 |
| 2,777,728 | * | 1/1957 | Barenyi | 296/28 |
| 2,947,567 | * | 8/1960 | Barenyi | 296/28 |
| 4,691,959 | * | 9/1987 | Verner | 296/184 |

FOREIGN PATENT DOCUMENTS

| | | |
|---|---|---|
| 94 13 375 | 12/1994 | (DE) . |
| 0 444 558 | 9/1991 | (EP) . |
| 0 672 575 | 9/1995 | (EP) . |
| 872 026 | 4/1942 | (FR) . |
| 1 024 653 | 4/1953 | (FR) . |
| 2 241 199 | 3/1975 | (FR) . |

* cited by examiner

Primary Examiner—Stephen T. Gordon
Assistant Examiner—G Blankenship
(74) Attorney, Agent, or Firm—Young & Thompson

(57) ABSTRACT

The present invention consists in giving access into transportation vehicles, by means of pivoting the major part of the body shell, on low placed lateral axes, in order to facilitate entrance and exit from three sides of the vehicle, including the front side; and without necessity of the space normally required by traditional doors.

13 Claims, 1 Drawing Sheet

FIG. 1)
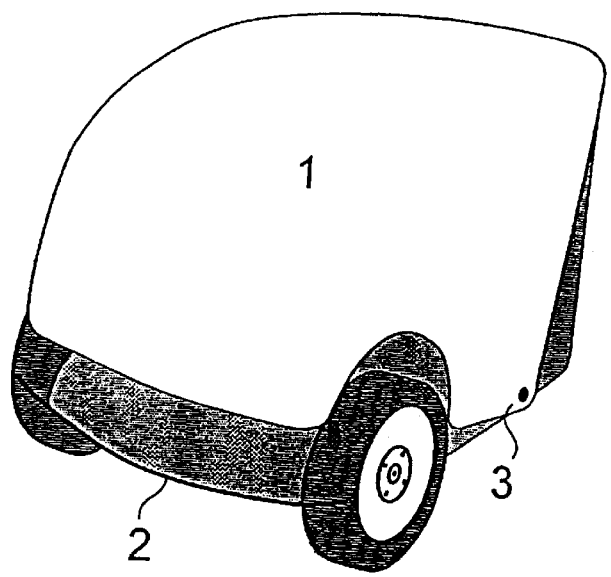
FIG. 2)
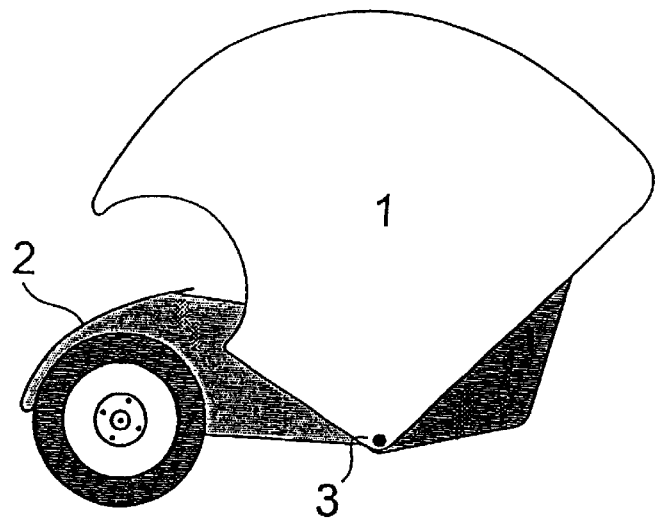
FIG. 3)
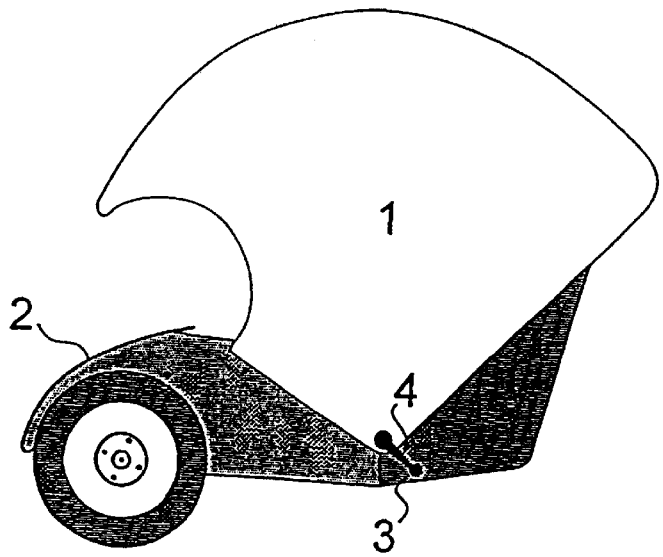

PIVOTING ACCESS INTO TRANSPORTATION VEHICLES

The present invention has an objective, notable technical innovations on the vehicles for transportation of people in very crowded towns and neighbourhoods. It is particularly suitable for small vehicles about two to three meters long.

BACKGROUND ART

Up to now, the access into the vehicles has been made through doors. These, although universally used, show some negative points:

they produce a lot of complexity in design and engineering;

in production, they require extreme precision, to avoid defective operating and water and dust penetration;

their cost is remarkable;

but, above all, their functionality is deceptive; in fact, they need a log of space to be opened enough to let people in and out;

in addition, each door offers one only passage and this is an important limitation, particularly where the parking areas are constricted and overcrowded—thus, it could be impossible to get out through the nearest door.

DISCLOSURE OF INVENTION

The innovations that are the object of this invention, have the principle scope of eliminating the above mentioned inconveniences and of making much more comfortable the city vehicles, providing three access on the three sides of the vehicle, by means of a unique pivoting element of the body shell.

The first characteristic of the invention consists in the fact that the front part of the body shell turns backwards on axes situated on the lower part of each lateral side of the vehicle, up to the point of standstill, where it stops to allow the entrance and exit of passengers and goods.

The second characteristic of the invention consists in the fact that by means of a single mobile element, when the front part of the body shell is lifted (open), it is possible to have access to the seats from the front, but also through the two sides of the vehicle; and this is possible without the lateral space required by traditional doors. This is very useful also for Handicapped Peoples.

DESCRIPTION OF THE INVENTION WITH THE HELP OF ATTACHED DRAWINGS

The above is more evident from the drawings reported on the attachement.

FIG. 1) and 2) show one of the essential part of the invention, id est: the 'pivoting part' of the body shell. The drawings do not show the windscreen, the side windows, the lights, the blades, the opening top, and other components that follow the inspiration of the Designer; but that are supposed to be installed on the vehicle.

FIG. 1) shows said "pivoting part" of the body shell when it is not anymore laying on chassis (2), but it is already slightly lifted, after having turned on the pivots (3) positioned on the two sides of the vehicle.

FIG. 2) shows the "pivoting part" of the body shell lifted up to the point of balance, after having turned further on the pivots (3).

After a rotation of a few more degrees, it will not be anymore necessary to hold the "pivoting part" of the body shell (1).—In fact this will fall backwards until it will stand still by means of a stopping element.—Therefore the balancing part will be kept open and still by the axes (3) on one side, and, on the other side, by the above mentioned stopping element.

To close the vehicle, it is enough to lift, with a minimum effert, the pivoting element (1) back to the balancing point, and then forewards, until it will lay down on element (2).

The above is only an example of the mechanisms adoptable for the movement of the pivoting part of the body shell, that is the essential part of this Industrial Invention.

In order to facilitate the opening and closing of the pivoting body element, it can be employed one or more gas sprins or other mechanisms, apt to help the vehicles opening and closing maneuvres.—Also the pivots indicated at (3) can be consistent of much more complex mechanisms, however apt to consent the rotation of front and lateral parts of the vehicle's body shell, as per mentioned explaining example.

For example, a variant is shown at FIG. 3).—In this drawing an arm (4) connects the pivoting part of the body shell to the pivot (3) on both sides of the vehicle, positioned more backwards than in FIG. 1) & 2).—This permits to move the pivoting part of the body shell as already discribed, but to make it lift more in the rotation; this feature could also be useful to make it easier to set the inside of the vehicle and to increase its functionality.

What is claimed is:

1. A vehicle for transporting people comprising:
   a body comprising a passenger compartment and a front wheel axle;
   two pivots on opposing sides of said body at a level of said front wheel axle and at a distance from a front of said body that is about two-thirds of a front to rear length of the vehicle; and
   a passenger compartment cover pivotally attached to said body at said two pivots.

2. The vehicle of claim 1, wherein said passenger compartment cover is structured and arranged to pivot between a first position at which said passenger compartment is closed to prevent passenger egress and a second position at which said passenger compartment is open to permit passenger egress.

3. The vehicle of claim 2, wherein said passenger compartment cover also covers said front of said body when in the first position.

4. The vehicle of claim 1, further comprising extension arms by which said passenger compartment cover is attached to said two pivots.

5. The vehicle of claim 1, wherein said passenger compartment cover rotates on said two pivots toward said front of said body to cover said passenger compartment and away from said front of said body to open said passenger compartment.

6. The vehicle of claim 1, wherein said passenger compartment cover, in a side view, is approximately a quarter circle.

7. The vehicle of claim 6, wherein said passenger compartment cover has cutout portions to accommodate front wheels of the vehicle.

8. The vehicle of claim 1, wherein said passenger compartment cover is generally one quarter bubble-shaped and wherein said two pivots are attached to said passenger compartment cover at poles of said one quarter bubble-shaped passenger compartment cover.

9. A vehicle for transporting people comprising:

a body comprising a passenger compartment and a front wheel axle;

two pivots on opposing sides of said body at a level of said front wheel axle and at a distance from a front of said body that is more than about one-half of a length of the vehicle; and a passenger compartment cover pivotally attached to said body at said two pivots, said passenger compartment cover being, in a side view, approximately a quarter circle, wherein said passenger compartment cover has a forward position at which said passenger compartment is closed to prevent passenger egress and at which said front of said body is covered and a rearward position at which said passenger compartment is open to permit passenger egress.

10. The vehicle of claim 9, further comprising extension arms by which said passenger compartment cover is attached to said two pivots.

11. The vehicle of claim 9, wherein said passenger compartment cover has cutout portions to accommodate front wheels of the vehicle when in the forward position.

12. The vehicle of claim 9, wherein said two pivots are attached to said passenger compartment cover at poles of said quarter circle.

13. The vehicle of claim 9, wherein said passenger compartment cover is generally one quarter bubble-shaped.

* * * * *